United States Patent
Chien

(12) United States Patent (10) Patent No.: US 7,611,253 B2
Chien (45) Date of Patent: Nov. 3, 2009

(54) MULTIPLE FUNCTIONS LED NIGHT LIGHT WITH AIR FRESHENER

(76) Inventor: Tseng-Lu Chien, 8F. No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/527,628

(22) Filed: Sep. 27, 2006

(65) Prior Publication Data

US 2007/0076440 A1 Apr. 5, 2007

(51) Int. Cl.
*F21V 9/16* (2006.01)
(52) U.S. Cl. .......................... 362/84; 362/641; 362/642; 362/643; 362/644; 362/276
(58) Field of Classification Search .................. 362/84, 362/641, 642, 643, 644, 276, 800; 439/6, 439/8, 11, 31, 639, 640
See application file for complete search history.

(56) References Cited

U.S. PATENT DOCUMENTS

| | | | | |
|---|---|---|---|---|
| 4,974,126 A | * | 11/1990 | Hwang | 362/96 |
| 6,021,033 A | * | 2/2000 | Benham et al. | 361/42 |
| 6,158,868 A | * | 12/2000 | Chien | 362/84 |
| 6,478,440 B1 | * | 11/2002 | Jaworski et al. | 362/96 |
| 6,581,915 B2 | * | 6/2003 | Bartsch et al. | 261/26 |
| 6,728,478 B2 | * | 4/2004 | Cox et al. | 392/390 |

* cited by examiner

*Primary Examiner*—Sandra L O'Shea
*Assistant Examiner*—Mark Tsidulko
(74) *Attorney, Agent, or Firm*—Bacon & Thomas, PLLC

(57) ABSTRACT

A multiple function LED night light with air-freshener includes an LED display unit with light-medium properties to allow light beams from LED(s) located at LED input-ends of the display unit to travel within the light-medium and be uniformly emitted through a surface of the display for even brightness without hot spots. A housing of the night light includes a slot, space, room to allow an air-freshener, an LED display, a sealed-unit and all related electric components including a heat element or fan device to be disposed within the night light housing to provide multiple functions in addition to those of a conventional night light.

14 Claims, 5 Drawing Sheets

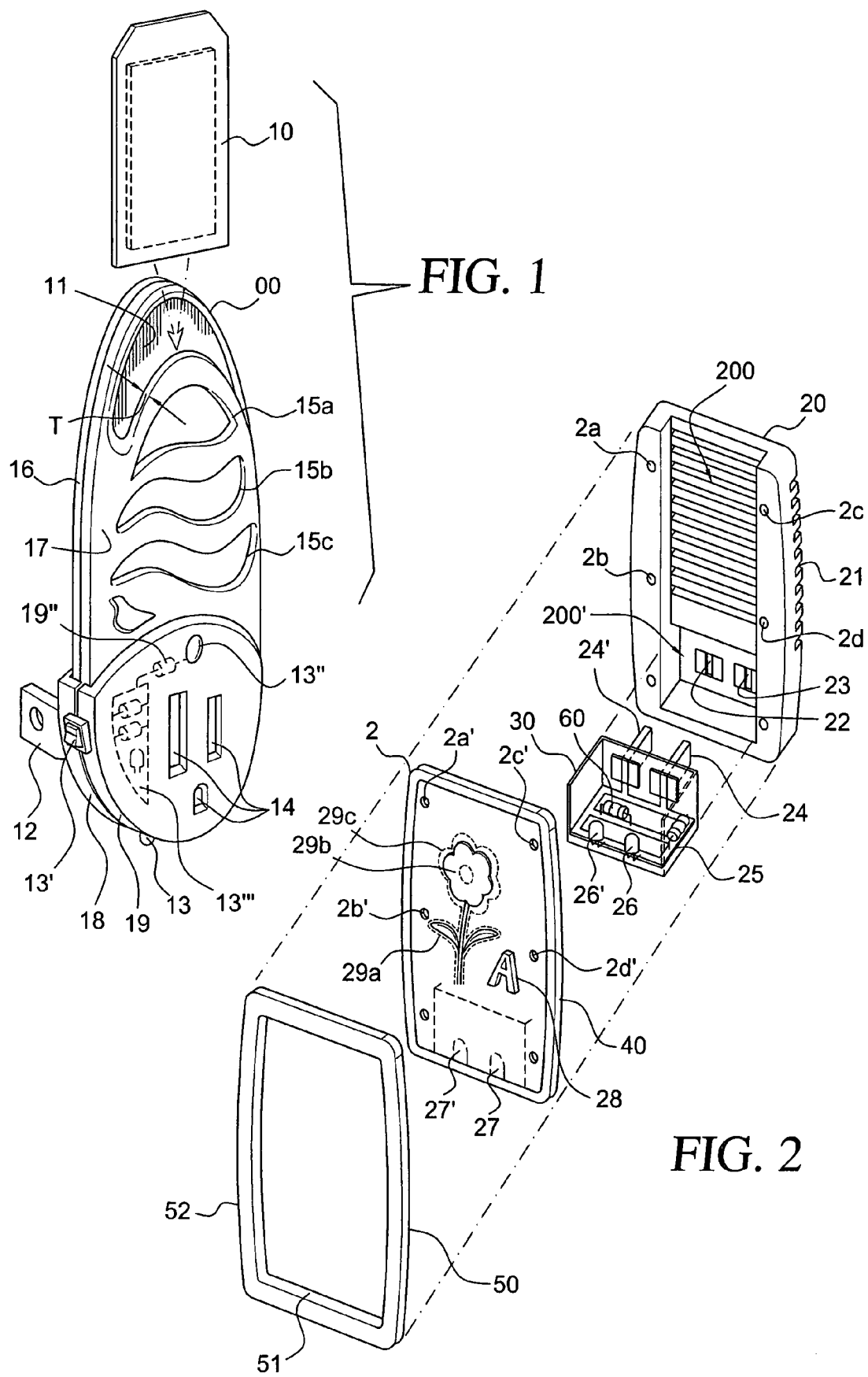

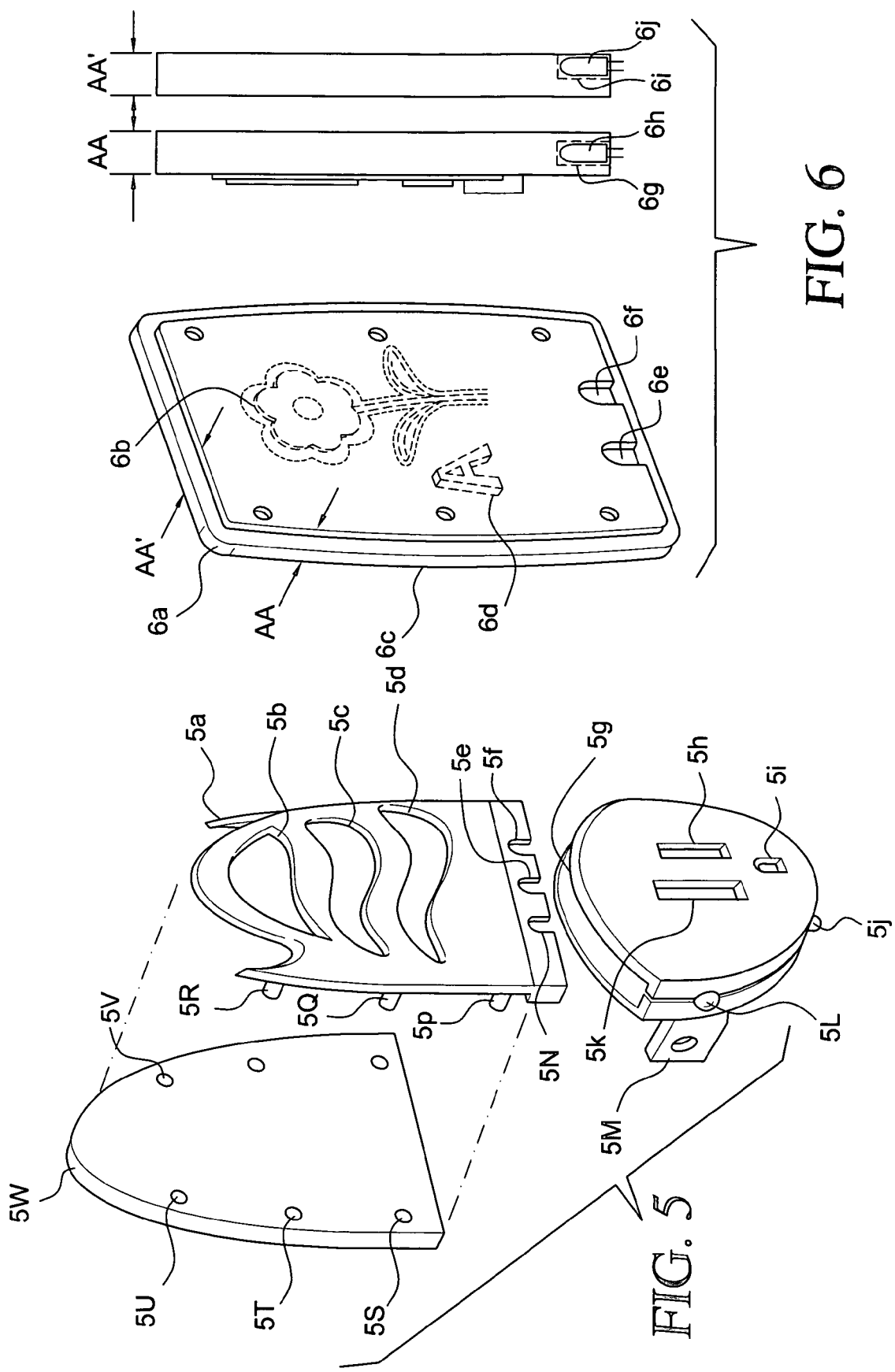

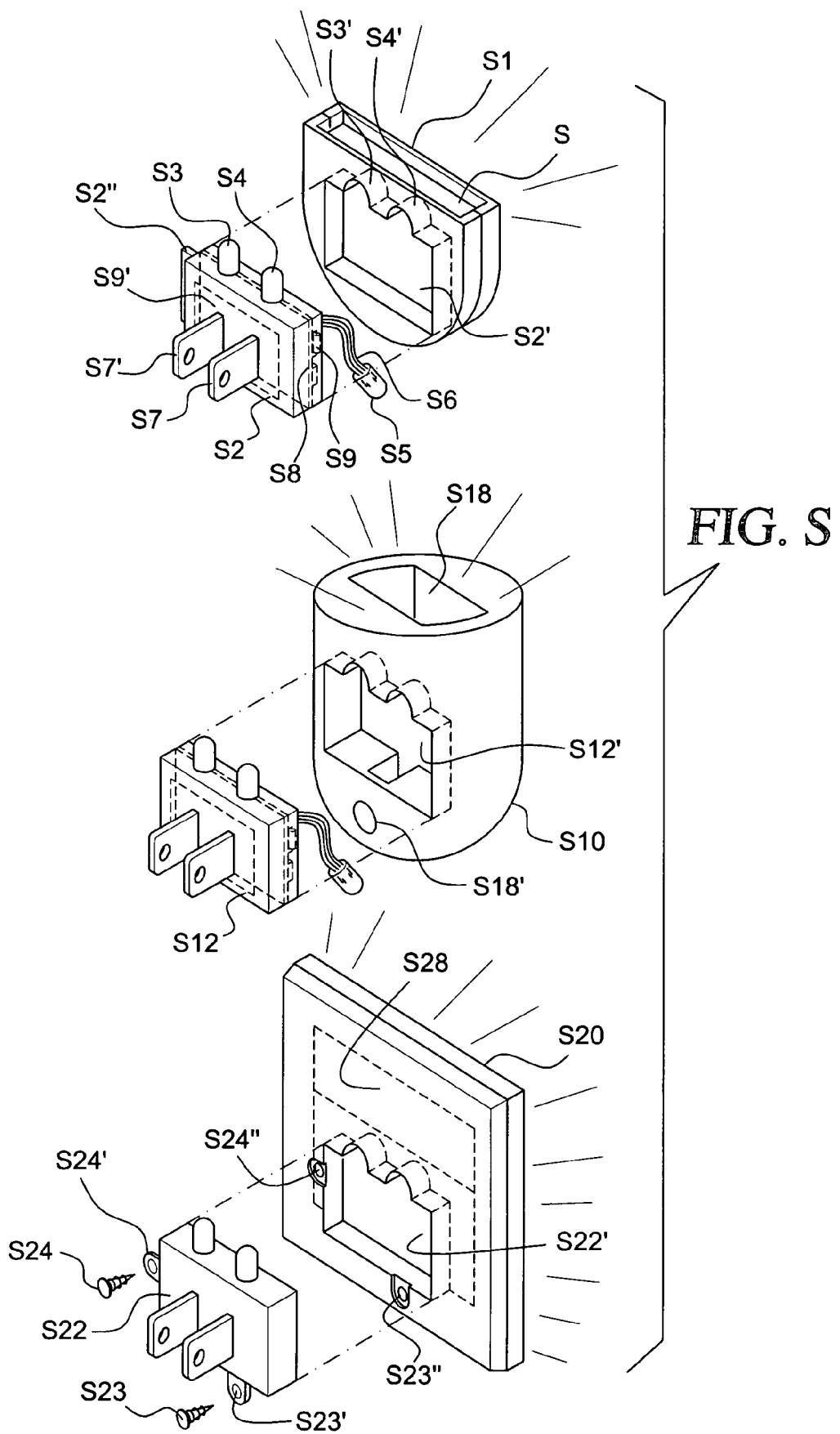
FIG. S

MULTIPLE FUNCTIONS LED NIGHT LIGHT WITH AIR FRESHENER

BACKGROUND OF THE INVENTION

Subject matter related to this application is disclosed in commonly assigned copending U.S. patent application Ser. Nos. 10/954,189, 11/094,155; 11/094,156; 10/667,787; 10/286,871; 10/621,513; 11/094,215; and 11/255,981. U.S. Patents that provide background on the lighting arrangements disclosed in this application include U.S. Pat. Nos. 6,714,725; 6,810,204; 6,853,801; 6,871,794; 6,895,177; 6,897,381; 6,901,215; 6,902,817; and D518,883.

S.C. Johnson's U.S. Pat. Nos. 4,849,606, D433,521, and 6,478,330 disclose incandescent light means with an air freshener refill unit.

General Electric's U.S. Pat. Nos. 6,302,559 and D468,033 disclose an electro-luminescent night light with air freshener refill piece.

Dial Corporation's U.S. Pat. Nos. 6,832,794, 6,839,506, 6,885,811, 6,920,282, 6,957,012, and 7,002,114 disclose plug-in air-freshener units but not how to apply LED light means to the units.

Intermatic's U.S. Pat. No. 6,854,208 a solar powered insecticide dispensing device with a lamp.

None of these prior art patents or publications discloses a light-medium arranged to enable an LED light source to provide area illumination without bright spots. Also, none teaches how to make such a light-medium with low cost and less labor intensity, much less use of such a medium to add value to an illuminated front LED display and which is easily installed into the space between the space of front and back base of the display. The prior art patents and publications fails to teach a sealed-unit that meets strict safety standards so that the rest of the night light can use very cheap materials, including paper. The prior art patents or publications also fail to teach an air-freshener unit that can be installed into a slot in the display from the side or top. Finally, the prior patents and publications do not teach application of a sand-blaster or roughening process to provide the light-medium with a milky/frosted front sheet to get the best lighting effects.

The current invention has all these features, as indicated in the following drawings and detailed description:

BRIEF DESCRIPTION OF THE DRAWINGS

FIG. 1 is an isometric view of a first embodiment of a multiple function night light with an air freshener, LED light for illumination, and at least one receptacle.

FIG. 2 is an exploded isometric view of a second embodiment of the current invention, which has a sealed-unit containing prong means and LED related circuitry sealed into a safety standard material housing.

FIG. 5 is an exploded isometric view of a housing assembly for the embodiment of FIG. 1, in which an LED display case is inserted into a slot between the base front and back.

FIG. 6 includes isometric and side views illustrating construction of a light-medium unit for use in the embodiment of FIG. 2.

Figure 3:
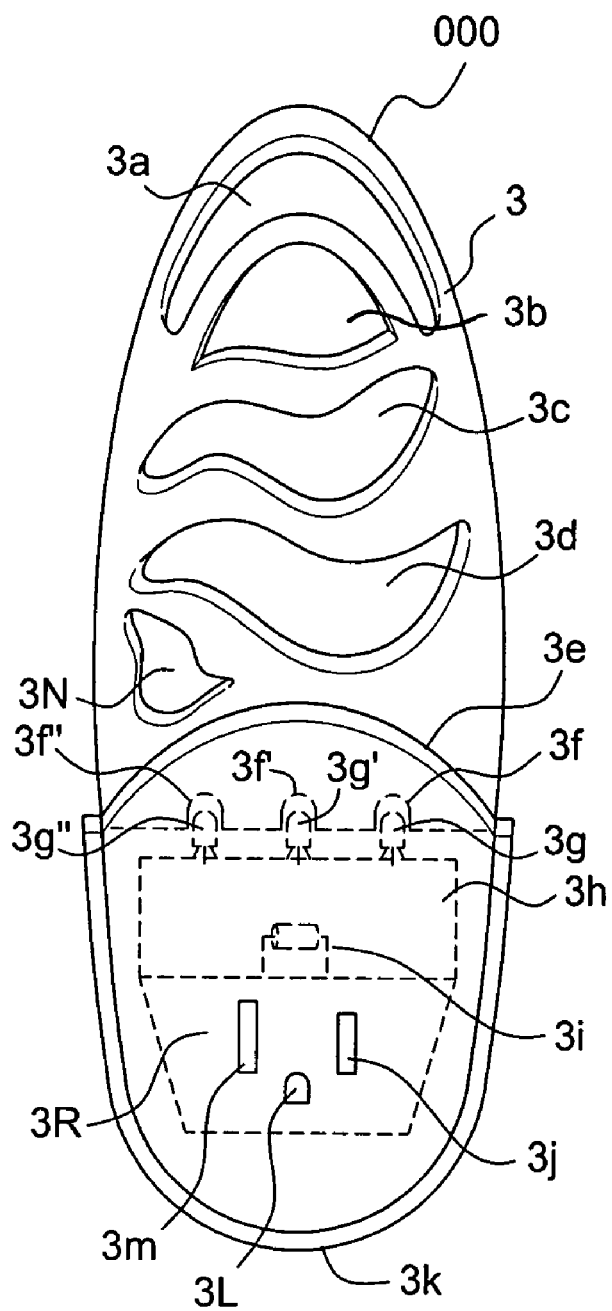
FIG. 3 is a front view showing a front surface of a variation of the embodiment of FIG. 1.

FIG. S are isometric views showing variations of a sealed-unit with LEDs that can be used in preferred embodiments of the invention.

DETAILED DESCRIPTION OF THE PREFERRED EMBODIMENTS

FIG. 1 shows a multiple function LED night light having an air freshener (10) inserted into a slot (11) in a housing assembly (00) formed by an LED display case (17) and back case (16). The LED display (17) has a desired shape, configuration, and thickness (T), and may include an opening (15*a*), window (15*b*), cut-out (15*c*), and/or curvature (such as a closed-U curvature). The display is designed to offer illumination of LED display surface (17) and fit into the space between the front (19) and back (18) base. As shown in FIG. 5, the LED display (5*a*) utilizes the optical properties of a light-medium (5*a*) having one or more LED input-ends (5*f*) (5*e*) (5*n*) so that the LED(s) can be installed at a convenient location and enable light beams from the LEDs to travel within the light-medium before being emitted to the viewer with very even brightness.

As shown in FIG. 3, at least one of the LED(s) (3*g*) (3*g'*) (3*g''*) are installed on a light-medium's input-ends (3*f*) (3*f'*) (3*f''*) and incorporated with related circuitry (3*h*), control means (not shown), sensor means (3R), and a power source to cause the LED(s) to illuminate with predetermined functions, for a predetermined period of time, and with desired colors and brightness.

FIG. 1 also shows at least one prong means (12) to connect the LED's related circuit (13''') with a wall outlet to supply power to the LED-related electric parts and components (13''') as well as a heater element (19'') or fan device (not shown) to cause air flow to spread the fragrance to a wide area and provide illumination. The heat element has very high power consumption so it preferably gets power from the wall outlet. The fan device may have a much smaller power consumption so it can be driven by the wall outlet power source, a battery power source, or a solar power source while using a different motor for the fan.

As shown in FIG. 1, a proper housing assembly (00) includes the slot (11), and further houses the above-described LED(s), light-medium in the form of an LED display (17), LED related electric parts and components such as a second LED (13'''), prong means (12), heater means (19''), receptacle means (14), sensor means (13''), second light source (13), and switch means (13') to complete the multiple function LED night light.

From FIG. 1, the front base (19) has openings (14) to form a grounded receptacle function. The front base (19) may have at least one window (13'') to install a second light source (13'''), or sensor means. Multiple functions may be obtained by further including a plurality of receptacles, a motion sensor, more than one LED as light source for multiple direction illumination, a time delay after trigger, a fan device, and/or heater elements. The prong means can be fixed or arranged to swivel.

FIG. 3 shows a multiple function LED night light (000) having a slot (3*a*) to allow the air freshener to be installed inside. The front LED display (3) has a lot of openings, windows, or cutouts (3*b*) to (3N) to allow the fragrance to spread out to open air more quickly and widely. The front LED display has an extended portion with LED input-ends (3*f*) (3*f'*) (3*f''*) to allow the LED(s) (3*g*) (3*g'*) (3*g''*) to be positioned and let a majority of light beams travel within the LED display and lbe seen on all surfaces by a viewer. The LED(s) (3g) (3g') (3g") are installed on the LED related circuit. A heating element (3i) also connects with the circuit to generate heat and cause hot air to flow up and create air flow to enable the fragrance to spread out quickly and to a big area. It also can use the fan device (not shown) to replace the heating element because the fan can be designed to have an appropriate rotating speed (rpm) with a super low power consumption motor to drive the fan blade and cause a large volume of air to flow to a far distance and spread out the air-freshener's fragrance to a broad area. Because some motors with very small power consumption can be drive by solar power system, it will be desirable to use solar power for free energy. However, which power source to use for the heating element and fan device will be determined by the power consumption. the heating element and/or fan device may use a wall outlet power source, battery power source, or solar power source for different heating element and fan device specifications. The fan device can use a super compact size with a super low power consumption model selected from conventional market available items. The heating element or means may be in the form of a resistor unit, resistor film, or other heater means selected from conventional market place available models.

As shown in FIG. 3, the front base (3e) has several openings (3j) (3L) (3m) which have inner metal components positioned respectively and connected to the power source. The openings (3j) (3L) (3m) form a grounded receptacle which allows people to have a receptacle to connect with other electric devices. This is very convenient to all consumers.

Figure 4:
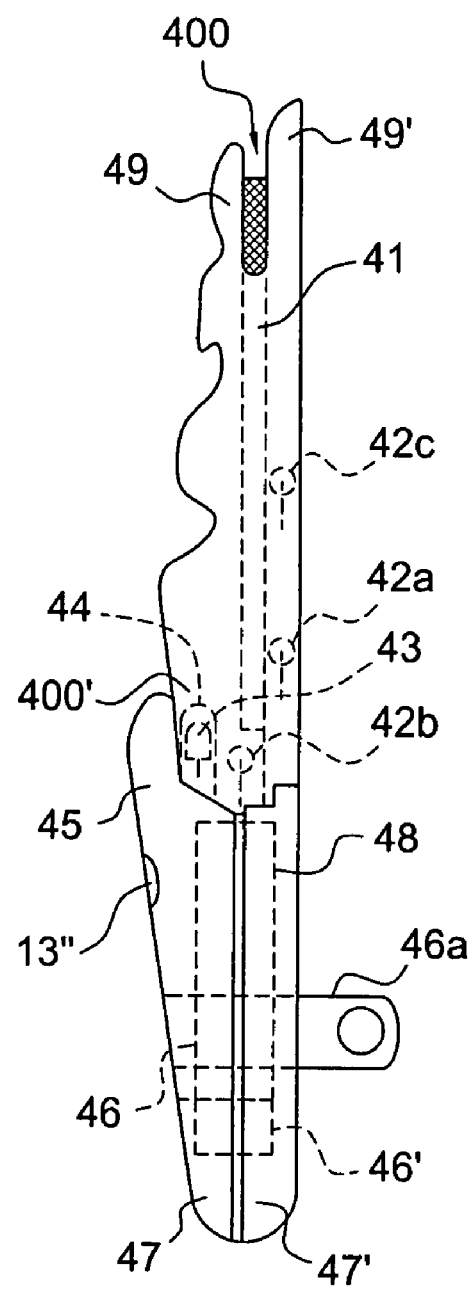
FIG. 4 is a side view of another variation of the embodiment of FIG. 1.

From FIG. 4, the LED display case (49) has a closed "U" shape with light-medium properties to allow the LED (43) located on the LED input-end (44) to cause a majority of light beams travel within the LED display case (49) and cause the brightness to be seen through all surfaces. The heating element (42b) is located on the bottom of the slot (400) between the LCD display case (49) and back case (49') to allow the air-freshener unit to be well installed into the slot and adapted such at least one of the heat elements (42a) (42b) (42c) generates heat and causes hot air to flow quickly up and the air freshener's fragrance to spread out to a broad area. The heating element is not limited to a resistor unit, but can also use other market skills such as are disclosed in prior art U.S. Pat. No. 7,002,114, which teaches a more advanced adjustable heating element. A fan device with a super low power consumption motor can be used to drive the fan blades to increase the airflow and spread out the air freshener fragrance to a wide area instantly.

FIG. 4 a lower front base (47) and back base (47') having a space to allow the LED display bottom (400') to be tightly installed in the space. It also offers room to allow LED(s), a receptacle metal piece (46) and LED related circuitry (46'), and prong means (46') to be installed in the space. The other opening, window, or cut-out on the front base may support other electric parts (13") such as a second light source, motion sensor, photo sensor or other type of sensor to provide additional functions. The air freshener unit may be in the form of a gel, liquid, or solid unit, and/or may include a flower, potpourri, dry flower, dry plants, or paper type fragrance source so long as the fragrance or smell is capable of being spread out for a period of time.

Figure 7:
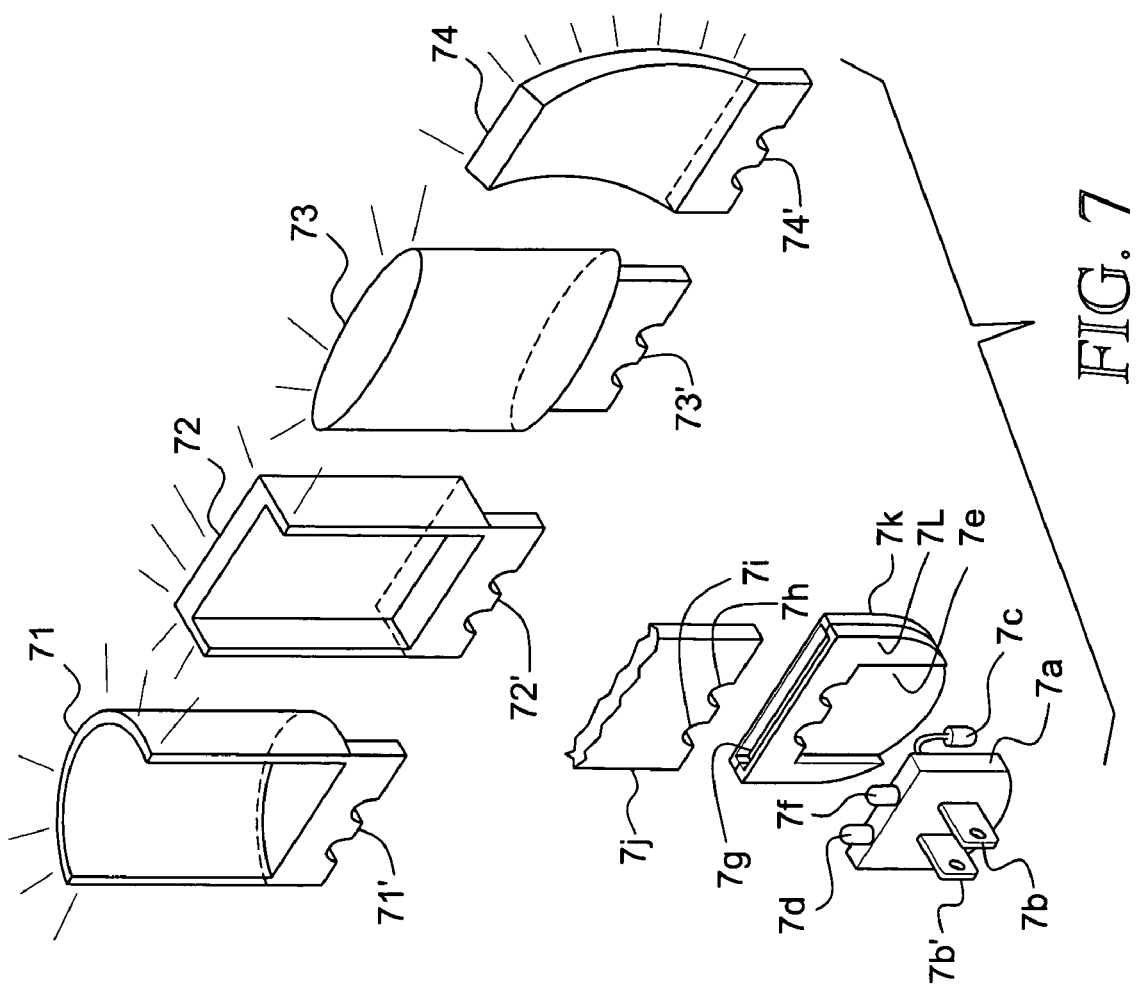
FIG. 7 are isometric views showing details of sealed-units and a base for use in various embodiments of the invention.

FIG. 7 shows an up-grade of the construction of FIG. 1. The night light complies with very strict safety regulations by using a plastic material that meets a flammability standard such as V-0 Grade of a certain plastic supplier with a fixed wall thickness. Based on this strict requirement, the highest cost saving design is to put the prong means and LED related circuit sealed into a sealed-unit. Hence, all of the parts connected with live wires will be sealed within the safety plastic material. The other night light materials are not subject to the safety requirements because they will not have any connection with a live wire. As shown in FIG. 7, all LED related circuitry and prong means (7b) (7b') are sealed within the safety plastic material box (7a). Only the LED's resin head is exposed to outside (the LED's metal legs cannot be seen from outside the box), so this is meet all safety standard requirements. This sealed-unit box fits well into the space (7e) provided in the base housing (7K). The LED(s) (7d) (7f) are well positioned such that the LED input ends (7i) (7h) respectively supply light beams that travel within the LED display (7j). The LED display (7j) is tightly press fit into the space (7g) between the front base (7K) and back base (7L). The LED display can have a variety of shapes and curvatures, such as a convex shape (71), U-shape (72), oval shape (73), and curve-shape (74), but each of these shapes has the same bottom (72') (73') (74') (75') to fit into the base tightly and can offer an interchangeable LED display as needed.

Turning to FIG. 2, the second preferred embodiment of the multiple functions LED night light with air freshener includes LED(s) (26) (26') incorporated with related electric circuit means (not shown) to make the LED(s) turn on under predetermined functions and period of time, color, and/or brightness.

Use of a light-medium as LED display (40) between the front housing (50) and back housing (20) with a desired configuration (the illustrated preferred configuration has a rectangular shape), opening (2a') (2b') (2c'), cut-out (preferably, in this embodiment a lot of cut-out holes for arranging fiber optics wires) (29a), window, curvature, and or designs (such as the illustrated flower and leaf design), stencils, drawing, or three-dimensional artwork (illustrated as an "A") on its surface to offer illumination over its whole surface.

The light-medium used as the LED display (40) is fixed between the front (50) and back housing (20) to form a slot (200) in which to install the air-freshener unit (not shown).

The front (50) and back housing (20) not only offer a space in which to fix the LED display but also a space (200') in which to install the prong means (24) (24'), LED(s) (26) (26'), electric parts and components required by the LED (by way of example but not limitation a circuit board (25)), sensor means, switch means, control means, other devices, and/or receptacle means to make the LED display exhibit attractive light functions and effects while prong means (26) (26') are connected with a power source.

At least one of heat element (60) or fan device (not shown) disposed within the housing's room (200') to make the air-fresher unit's fragrance to be wide spread out to wider area.

FIG. 6 shows an LED display (666) with a three-dimensional design on its surface in the form of a flower (6b) and leaves (6K) (6L) made of poly material with a very nice color and painting by hand. These very realistic flower (6b) and leaves (6K) (6L) cannot be made by a plastic injection process. However, in order to meet the strict safety standard, the preferred sealed-unit (FIG. 2 # 30) may be used as described above. Hence, the LCD display can be made of any material because all parts which connect with a live wire are already sealed within the sealed-unit (30) of FIG. 2. This is the most simple example of the value of the sealed-unit concept.

As shown in FIG. 6, the LED display (666) also has the logo "A" (6d) with a three-dimensional configuration. The plurality of LED input-ends (6e) (6f) form a groove arrangement which can see from AA', such that the LED (6j) will fit into the input-ends (6i). The alternative arrangement for LED input-end design can be seen in section AA of the drawing. The LED input-end (6g) includes material extending around four sides of the LED (6h). The LED input-ends (6e) (6f) on the LCD display of this application preferably use the groove so the front viewing angle will not have gaps. The light medium (6a) material can be selected from a plastic resin, poly, pottery, porcelain, PS, PP, PET, PVC, PC, acrylic, or any material which can allow the light beams to travel within the medium with special treatment on its surface. The light medium (6a) may be in any shape, configuration, curve, thickness as long as it can make the light beams travel within and brightness can be seen on its surface.

Figure 8:
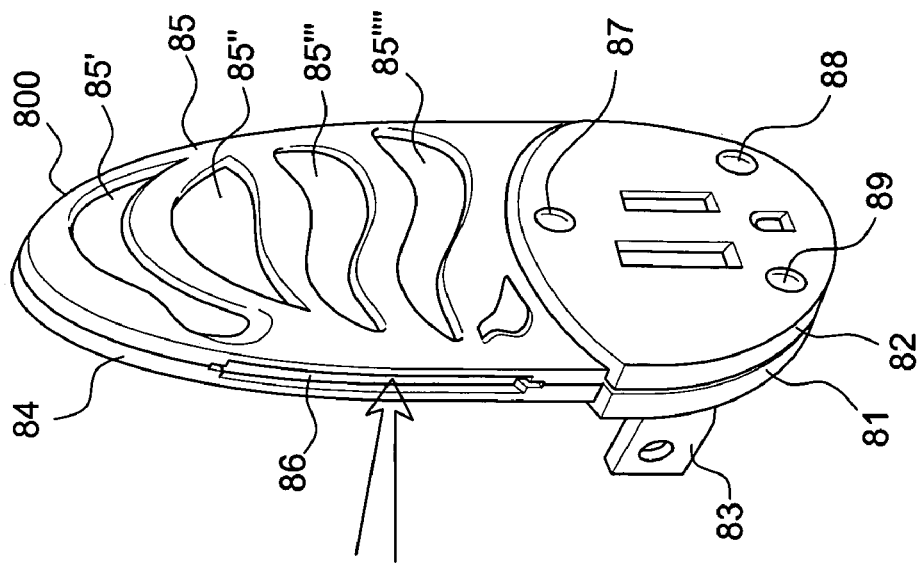
FIG. 8 is an isometric view of a variation of the preferred embodiment of FIG. 1, which has an air freshener slot on the side of the night light.

FIG. 8 shows a preferred night light (800) having a slot (86) in which to install the air-freshener unit (not shown) from the side instead of from the top of the night light. The front base has a plurality of openings (87), windows (88), and/or cut-outs (82) to install more than one LED(s), sensor means, or other electric device for multiple functions. It also may have a receptacle with a grounded design to offer the other electric device as a power source. The air freshener unit can use conventional market-available items to fit into the slot.

FIG. S shows a sealed-unit (S2) (S12) (S22) with a pre-designed opening (S2') (S12') (S22') to allow a universal type of sealed-unit (S2) (S12) (S22) to fit into the opening (S2') (S12') (S22') The sealed unit can use a conventional method to fasten with the base (S1) (S10) (S20), for example, by a screw (S23) (S24), welding, sonic sealing, glue, solvent, rivet, catcher, or equivalent fixing means to allow the sealed-unit to be fixed in position. The sealed-unit (S2) (S12) (S22) preferably uses plastic with a sufficient thickness to pass the 94-V-0 flammability grade and meet the safety standard. All other housing parts may be made without any limitation because they do not touch the live wires. The base (S1) (S10) (S20) can be any shape, configuration, design, curvature, thickness, material, and/or dimension with built-in or separate receptacle means. The sealed-unit has an LED related circuit, control means, and prong means disposed within, and the design can be super slim or wider and thicker but smaller depending on market requirements. For convenience, a desired unit can also be made which can fit into different base shapes such as a boat shape (S1), tube shape (S10), or rectangular shape (S20) for different night light applications.

The boat base (S1) has an opening (S2') to allow the sealed-unit (S2) to fit into the space. The sealed-unit (S2) has an LED related circuit (S8) and its components (S9) and prong means (S7) (S7') are sealed within the case (S2). The top of the case has two LEDs (S3) (S4) which are connected with the inner circuit (S8), but all the LEDs' electric legs cannot be touched by test equipment to make sure that a child's finger will not touch live wires to cause a dangerous condition. The LED (S5) can also use conductive wires (S6) to supply light far away from the unit's housing (S2) for other illumination arrangements.

The LEDs (S3) (S4) also fit into the base opening (S3') (S4') and a wall (S2") will cover the LEDs after assembly with the base housing. After assembly, the LED light beams can pass though the base's opening area (S) to provide good light effects to the upper display unit.

The tube base (S10) has an opening (S12') to allow the sealed-unit (S12) to fit into two or more LEDs at a desired position and orientation and with a desired wiring arrangement to allow the light beams to be emitted out from the base top opening (S18) and lower window (S18') for desired illumination.

The rectangular base (S20) is especially suitable for a surface light arrangement. The LED spot light beams are transmitted through the light-medium (S28) to allow the LED light beams to travel within the light-medium (S28) and a majority of the light beams to be seen by a viewer from the light-medium (S28) surface. The viewer will not see any hot spot of LED light brightness but instead will see a very soft and even photometric area light for special illumination. The Rectangular base (S20) has an opening (S22') to allow the sealed-unit (S22) to fit tightly and optionally be secured by glue, solvent, or other adhesive means, sonic means, welding means, catcher means, or hook means to the rectangular base (S20). The LED will fit into the light-medium's thickness to get the best result.

It is appreciated that the invention is not to be limited by the above description or embodiments. Any equivalent function, replacement, alternative process, treatments, experiments, and arrangements may still belong within the scope of the current invention, as defined by the appended claims.

The invention claimed is:

1. A multiple function LED night light with air freshener, comprising:
   a housing including at least one slot for installing an air freshener unit;
   said housing further accommodating at least one light medium arranged to receive light beams from at least one LED through an input, and to distribute the light beams evenly over a surface of the medium to provide area illumination an appearance of uniform brightness over the surface;
   said housing further accommodating circuitry for controlling illumination of said at least one LED and means for spreading a fragrance supplied by said air freshener unit; and
   said housing further accommodating at least one prong means for connecting the circuitry to a wall outlet to provide power to the LED means for spreading a fragrance,
   wherein said light medium is arranged to be mounted on said housing and said slot is formed between said light medium and a section of said housing such that said light medium defines one wall of said slot and said section of said housing defines a second wall of said slot, said slot accommodating said air freshener unit.

2. A multiple function LED night light with air freshener as claimed in claim 1, further comprising additional components selected from the group consisting of multiple receptacles, a motion sensor, additional LEDs for directional illumination, and a time delay to provide additional functions.

3. A multiple function LED night light with air freshener as claimed in claim 1, wherein said means for spreading a fragrance supplied by said air freshener unit is a heater element.

4. A multiple function LED night light with air freshener, comprising:
   a housing;
   circuitry in the housing for controlling at least one LED and prong means for supplying power from a wall outlet to said circuitry; and
   a light medium unit arranged to receive light beams from said at least one LED through an input, and to distribute the light beams evenly over a surface of the medium to provide area illumination an appearance of uniform brightness over the surface,
   wherein said light medium unit is arranged to be mounted on said housing and a slot is formed between said light medium unit and a section of said housing such that said light medium defines one wall of said slot and said section of said housing defines a second wall of said slot, said slot accommodating an air freshener unit.

5. A multiple function LED night light with air freshener as claimed in claim 4, said housing further accommodating circuitry for controlling illumination of said at least one LED and at least one heater element or fan device for spreading a fragrance supplied by said air freshener unit; and said housing further accommodating at least one prong means for connecting the circuitry to a wall outlet to provide power to the LED and heater element or fan device.

6. A multiple function LED night light with air freshener as claimed in claim 4, wherein said housing includes a front housing and a back housing, and said light medium unit is situated between the front housing and the back housing, said light medium unit including decorative elements selected from the group consisting of a decorative shape, openings, windows, curvature, designs, stencils, drawings, and three-dimensional artwork on said surface.

7. A multiple function LED night light with air freshener as claimed in claim 4,
  wherein said circuitry is sealed within a box made of a plastic material that meets a flammability safety standard,
  wherein said housing, said light medium unit, and said air freshener are outside said sealed unit, and
  wherein said housing is made of a material other than said plastic material.

8. A multiple function LED night light with air freshener as claimed in claim 4, wherein said prong means is fixed in said housing.

9. A multiple function LED night light with air freshener as claimed in claim 4, wherein said prong means is arranged to swivel.

10. A multiple function LED night light with air freshener as claimed in claim 4, further comprising additional components selected from the group consisting of multiple receptacles, a motion sensor, additional LEDs for directional illumination, a time delay, and a heater element to provide additional functions.

11. A multiple function LED night light with air freshener as claimed in claim 10, comprising said heater element for dispersing fragrance from said air freshener to a wide area.

12. A multiple function LED night light with air freshener as claimed in claim 4, wherein said air freshener unit includes a material selected from the group consisting of a gel, flowers, potpourri, dry plants, and a paper-type medium.

13. A multiple function LED night light with air freshener as claimed in claim 4, further comprising additional LEDs for providing illumination at multiple angles.

14. A multiple function LED night light with air freshener as claimed in claim 4, wherein said light medium is made of a material selected from the group consisting of plastic resin, poly, pottery, porcelain, PS, PP, PET, PVC, PC, and acrylic.

* * * * *